United States Patent [19]
Virnig

[11] Patent Number: 5,885,327
[45] Date of Patent: Mar. 23, 1999

[54] PROCESS FOR THE RECOVERY OF GOLD

[75] Inventor: Michael J. Virnig, Tucson, Ariz.

[73] Assignee: Henkel Corporation, Gulph Mills, Pa.

[21] Appl. No.: 708,479

[22] Filed: Sep. 5, 1996

Related U.S. Application Data

[60] Provisional application No. 60/003,577, Sep. 12, 1995.
[51] Int. Cl.[6] ........................................ C22B 11/00
[52] U.S. Cl. ............................ 75/710; 75/736; 75/737; 75/744
[58] Field of Search .............. 75/736, 737, 744; 210/638, 639, 679; 423/24, 29, 31, 100

[56] References Cited

U.S. PATENT DOCUMENTS

| | | | |
|---|---|---|---|
| 4,895,597 | 1/1990 | Lin et al. | 75/118 |
| 5,028,259 | 7/1991 | Lin et al. | 75/722 |
| 5,134,169 | 7/1992 | Green et al. | 521/25 |
| 5,198,021 | 3/1993 | Virnig | 75/744 |
| 5,340,380 | 8/1994 | Virnig | 75/744 |

*Primary Examiner*—Patrick Ryan
*Assistant Examiner*—M. Alexandra Elve
*Attorney, Agent, or Firm*—Ernest G. Szoke; Wayne C. Jaeschke; Patrick J. Span

[57] ABSTRACT

Recovery of gold from alkaline cyanide leach solutions using ion exchange adsorbents, comprising (a) contacting the cyanide leach solution containing the gold with an extraction reagent comprised of a solid adsorbent carrying an organic base functionality of a compound having a $pK_a$ between about 9–14, such as a guanidyl functionality, to adsorb gold and eluting the adsorbed gold from the solid adsorbent with an aqueous alkaline eluant solution having a pH above about 12 and containing an alkali metal salt of an aromatic or aliphatic carboxylic acid having from about 4–14 carbon atoms, the eluant solution having incorprated therein from about 0.001 moles to about 0.2 moles per liter of an alkali metal cyanide salt. The solid adsorbent containing the aurocyanide complex may be contacted with a concentrated aqueous solution of a zinc tetracyanide salt whereby the aurocyanide complex is displaced with a zinc tetracyanide complex before treatment with the eluant solution.

8 Claims, No Drawings

PROCESS FOR THE RECOVERY OF GOLD

CROSS-REFERENCE TO RELATED APPLICATIONS

This application claims priority from U.S. provisional application Ser. No. 60/003,577, filed Sep. 12, 1995, the disclosure of which is incorporated herein by reference.

FIELD OF THE INVENTION

This invention relates to the recovery of gold from alkaline cyanide leach solutions using ion exchange adsorbents.

BACKGROUND OF THE INVENTION

Gold is recovered from its ores by leaching with alkaline cyanide solution, forming the aurocyanide ion $Au(CN)_2^-$ in solution. Concentrations are generally very low, typically a few parts per million (ppm) or less. The gold is typically adsorbed from solution by activated carbon, and is in turn removed from the carbon by elution with a caustic solution. The caustic solution, now relatively concentrated in gold, is treated by electrowinning to recover elemental gold.

One of the disadvantages of carbon is the complexity and cost of its regeneration after caustic elution. Precipitation of carbonates tend to clog the carbon pores, and adsorption of traces of organic materials can deactivate its gold adsorption properties. To restore the carbon's activity, it is treated with a mineral acid solution and then roasted. During each cycle of the roasting process, a significant portion of the carbon mass is lost, resulting in decreasing particle diameters. When the particles become so small that they risk being lost to the leaching system along with their loaded gold, they must be removed and discarded.

An alternative to carbon adsorption is adsorption on an ion exchange resin. With ion exchange resins, the gold can be recovered by simple caustic elution; further regeneration steps are not needed. To accomplish this, the reactive functionality of the resin must be pH-dependent; that is, capable of adsorbing aurocyanide over the pH range typical of cyanide leach solutions—normally pH 9 to 11—and also capable of eluting aurocyanide in the pH range of eluant solutions—normally above pH 12. This means the functionality must be in its cationic form during extraction and neutral during elution. One of the few functionalities capable of this specific pH dependency is the guanidine functionality. Guanidine ion exchange resins for recovery of precious metals have been described in U.S. Pat. Nos. 4,895,597, 5,028,259 & 5,198,021.

It is desirable in an ion exchange system for gold recovery that the rate and extent of elution of gold be as great as possible. Slow elution rates mean that the resin must spend a larger portion of its cycle time in the elution process rather than extracting more gold, and the equipment for conducting the elution must be larger. To the extent that gold elution is not complete, gold will be carried with the eluted resin back to extraction so that its ultimate recovery is delayed. Furthermore, residual gold on eluted resin may result in less complete extraction of gold from the leach solution.

A significant means for increasing the rate of gold elution from ion exchange resins is described in U.S. Pat. No. 5,198,021, in which the combination of an alkali metal hydroxide and an alkali metal salt of an aliphatic or aromatic carboxylic acid is used to elute gold. It would be desirable to be able to enhance the rate of gold elution still further, allowing the size of elution equipment to be decreased and permitting more reliable operation of the overall gold recovery system.

DESCRIPTION OF THE INVENTION

It has been found that the elution of gold from solid adsorbents carrying organic base functionality of a compound having a $pK_a$ between about 9 and about 14 using an alkaline eluant having a pH above about 12 and containing an alkali metal salt of an aromatic or aliphatic carboxylic acid containing from 4 to 14 carbon atoms at a temperature from about 45° C. to about 100° C. can be improved by the incorporation into the eluant of an alkali metal cyanide salt at a concentration of from about 0.001M to about 0.2M. The rate of gold elution is substantially increased, and the level of residual gold on the eluted resin is decreased.

The eluant contains sufficient alkali metal hydroxide, typically sodium hydroxide or potassium hydroxide, to maintain a pH of at least about 12, and preferably at least about 13. In terms of molar concentration, the hydroxide component will lie in a range of about 0.1M to 2M, preferably from about 0.1 to about 1M, and most preferably from about 0.5M to about 1M.

The eluant also contains an alkali metal salt of an aromatic or aliphatic carboxylic acid containing from 4 to 14 carbon atoms. In the case where the carboxylic acid salt is aliphatic, the number of carbon atoms contained is preferably from 4 to 10. The most preferred aliphatic carboxylic acid salt is that of octanoic acid or 2-ethylhexanoic acid. The most preferred aromatic acid salt is that of benzoic acid. The concentration of carboxylic acid salt will lie in a range of from about 0.05M to about 2M, preferably from about 0.1M to about 1M, and most preferably from about 0.5M to about 1M.

The concentration of alkali metal cyanide will lie between about 0.001M to about 0.2M, preferably from about 0.002M to about 0.1M, and most preferably from about 0.01M to about 0.04M. A preferred eluant composition contains about 0.5M sodium hydroxide, about 0.5M sodium benzoate, and about 0.02M sodium cyanide. Other alkali metal salts may be used in addition to or instead of cyanide salts; these include alkali metal salts of cyanate, thiocyanate or thiosulfate anions.

In order to benefit from the elution rate increase due to cyanide, the elution is carried out at elevated temperatures. Preferred temperatures lie between about 45° and 100° C., with more preferred temperatures between about 50° and 70° C.

The solid adsorbent may carry the organic base functionality either as a compound covalently bonded to the solid phase or as a water-insoluble compound impregnated by adsorption onto the surface of the solid phase. In either case, the solid phase serves as an insoluble carrier of the extracting functionality. The solid phase may be, for example, a polyurethane foam, a gel-type polystyrene-divinylbenzene resin, or, more preferably, a macroporous resin.

The organic base functionality is that of a compound which has a $pK_a$ between about 9 and about 14. This means that the compound, when dissolved in an aqueous solution, will be at least half protonated by a mineral acid at a pH between about 9 and about 14. Preferably the $pK_a$ is between about 10 and about 13. When carried by a solid adsorbent, organic bases of these strengths will be ionized under conditions suitable for extraction of gold from alkaline cyanide leach solutions, and will be rendered neutral by strong alkali eluant solutions. Examples of such functionalities are imidazoles and guanidines. Guanidines are a preferred functionality. A preferred mode uses the improved eluant of the invention with guanidine ion exchange resins prepared by the method described in U.S. Pat. No. 5,198,021, the disclosure of which is incorporated herein by reference.

By guanidine functionality is meant those compounds, reagents or ion exchange resins containing the functional group:

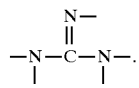

In regard to the ion exchange resins the group is bonded by chemical reaction to the resin through any one of the N atoms. The remaining bonds of the nitrogen atom are filled by hydrogen, aliphatic or aromatic hydrocarbon groups or cyclic (including heterocyclic groups containing nitrogen atoms), straight or branched chain, saturated and unsaturated containing up to 25 carbonations, as will be discussed in more detail in the description to follow. Aspects and advantages of the present invention will be apparent to those skilled in the art upon consideration of the following detailed description thereof. Thus, the guanidine reagent suitable for use in the present extraction processes may be further illustrated by means of the idealized formula:

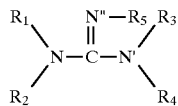

wherein $R_1$ through $R_5$ is selected from the group consisting of H, an ion exchange resin backbone and aromatic and aliphatic groups having up to 25 carbon atoms. Preferably, as noted earlier, guanidine compounds which are chemically reacted with the ion exchange resin for the liquid/solid system are those having a $pK_a$ at 25° C. between 10 and 13. The ion exchange resin may be bonded to the guanidine to any one of the nitrogen atoms such as at N" or N or N'.

With regard to the guanidine functionality reagents, the preferred reagent, for the liquid/solid extraction system of the present invention is unsubstituted guanidine itself carried by a styrene, divinyl benzene resin matrix or carrier in which the guanidine is attached to the benzene ring of the resin through a $CH_2$ group resulting from chloromethylation of the polystyrene.

In another variation, a highly concentrated solution of zinc tetracyanide (preferably about 0.6 to 0.7M) is used to displace the aurocyanide complex from the resin, after which the zinc tetracyanide complex is eluted from the adsorbent using a caustic solution. A similar approach has been employed to strip aurocyanide from quaternary amine functionalized resins in which the gold is first eluted with zinc complex and the resin then stripped with a sulfuric acid solution. Such approach poses problems in that toxic hydrogen cyanide gas is liberated, which must be removed by passing it through a caustic solution to give a caustic sodium cyanide solution. In the variation of the present invention, however, the zinc is eluted readily with an alkaline, i.e., sodium hydroxide, solution, which after partial neutralization can be re-used in gold elution. This avoids the need to handle large volumes of hydrogen cyanide gas. In addition, an advantage of the zinc tetracyanide based elution of the gold from the preferred guanidine functionalized resin may be that stripping is less dependent on the nature of the resin beads. Further, the zinc cyanide also displaces extracted anions other than gold, and poisoning of the resin is minimized.

To illustrate the various objects and advantages of the present invention, the following examples are provided in which all parts and percentages are by weight unless otherwise indicated. It is understood that their purpose is entirely illustrative and in no way intended to limit the scope of the invention.

The following procedures were used to load and to elute guanidine ion exchange resins Loading An aqueous extraction solution was prepared to contain 150 ppm NaCN and the following concentrations of metals as their cyanides:

| | |
|---|---|
| Au | 34 ppm |
| Cu | 20 ppm |
| Ag | 1 ppm |
| Co | 2 ppm |
| Zn | 4 ppm |
| Ni | 10 ppm |
| Fe | 20 ppm |

The pH was adjusted to 10.2 to 10.5. Loading was conducted at a 1:200 volume ratio of resin to aqueous solution, rolling the mixture in a bottle for 16–24 hours. The resin was recovered by suction filtration, washing with a small volume of deionized water, drying and digesting for analysis of metal content.

Elution

A 3 ml sample of loaded resin was placed into a 0.7 cm diameter jacketed column having thermostatted water passing through the jacket. Eluant was passed through the column at a slow rate; 3 ml/hour equals 1 bed volume (BV) per hour. Eluant was collected for a prescribed period, generally 24 and/or 48 hr. Eluted resin was rinsed with deionized water, dried, and digested for analysis of metal content.

Three samples of guanidine-functionalized (unsubstituted guanidine) resins were labeled A, B and C. These resins were loaded according to the procedure above, and eluted at 60° C. with eluant of the indicated composition. Data from resin A, a relatively slower eluting sample, are reported in Table 1.

TABLE 1

| | Elution of Resin A | | | | | |
|---|---|---|---|---|---|---|
| | | Gold conc., ppm | | NaCN in | Flow | |
| Run No. | Loaded Resin | 24 hr Elution | 48 hr Elution | Eluant, M | Rate, BV/hr | Comments |
| 1 | 11,900 | 2,150 | 870 | none | 0.9 | Loaded at resin/aq. ratio = 125 |
| 2 | 17,500 | 153 | — | none | 3.0 | |
| 2A | 17,500 | 93 | — | none | 4.6 | |
| 3 | 15,800 | 135 | BDI* | 0.0204 | 2.0 | |

TABLE 1-continued

Elution of Resin A

| Run No. | Gold conc., ppm | | NaCN in Eluant, M | Flow Rate, BV/hr | Comments |
|---|---|---|---|---|---|
| | Loaded Resin | 24 hr Elution | 48 hr Elution | | | |
| 4 | 18,200 | 748 | — | 0.0102 | 1.0 | |
| 5 | 18,200 | 6,720 | — | 0.0102 | 0.9 | Eluted at 30° C. |
| 6 | 16,800 | 990 | — | 0.0051 | 1.0 | |
| 7 | 15,500 | 284 | 60 | 0.0051 | 1.3 | |
| 8 | 16,800 | 6,440 | — | 0.0051 | 0.8 | Eluted at 30° C. |
| 9 | 17,000 | 4,050 | — | 0.0051 | 1.5 | No sodium benzoate in elutant |
| 10 | 17,000 | 964 | — | 0.00204 | 1.0 | |

*Below detection limit

The data in Table 1 support a number of conclusions. (1) When operating at conservative flow rates without cyanide in the eluent, the rate of gold elution is slow; but with rapid flow rates, elution is fast and relatively complete. Rapid flow rates, however, generate a more dilute eluant product. (2) Sodium cyanide is effective at increasing elution rates, even as low as 100 ppm. (3) Rapid elution requires the presence of carboxylate salt. (4) Elevated temperatures above 30° C. are required for fast elution rates.

Resin B was loaded under field conditions with an actual mine leach solution, and then eluted under the above procedure, the results are shown in Table 2.

TABLE 2

Elution of Resin B

| Run No. | Gold conc., ppm | | NaCN in Eluant, M | Flow Rate, BV/hr | Comments |
|---|---|---|---|---|---|
| | Loaded Resin | 24 hr Elution | 48 hr Elution | | | |
| 1 | 9,260 | 3,740 | 3,350 | none | 1.0 | |
| 2 | 9,260 | 593 | 256 | 0.0204 | 1.0 | |

It is not clear why this sample of resin gave slow elution rates and incomplete removal of gold even after 48 hours, but the addition of cyanide to the eluant dramatically enhanced the elution performance.

Resin C was loaded and eluted under the conditions described; results are shown in Table 3.

TABLE 3

Elution of Resin C

| Run No. | Gold conc., ppm | | NaCN in Eluant, M | Flow Rate, BV/hr | Comments |
|---|---|---|---|---|---|
| | Loaded Resin | 24 hr Elution | 48 hr Elution | | | |
| 1 | 18,200 | 1,070 | 511 | none | 1.5 | |
| 2 | 17,200 | 769 | 310 | none | 1.4, 1.2 | |
| 3 | 18,100 | 703 | — | none | 1.8 | |
| 4 | 17,800 | 281 | 23 | 0.0204 | 2.4, 2.0 | |

Even though resin C has relatively fast elution rates, it is still substantially improved by addition of cyanide to the eluant. One can reach a lower residual gold level in 24 hr with cyanide present than one can in 48 hours without cyanide. In a commercial operation, this is an important difference.

A sample of resin B was also treated with a 0.72M solution of sodium zinc tetracyanide, producing a resin containing only 570 ppm gold, or about 94% stripping. Subsequently the zinc tetracyanide complex, which is much more readily eluted with caustic than is the aurocyanide, can then be eluted simply with caustic.

We claim:

1. In a process for recovering gold from cyanide leach solutions comprising (a) contacting said cyanide leach solution containing the gold with an extraction reagent comprised of a solid adsorbent carrying an organic base functionality of a compound having a $pK_a$ between about 9 and about 14 to adsorb said gold and eluting the adsorbed gold from the solid adsorbent with an aqueous alkaline eluant solution having a pH above about 12 and containing an alkali metal salt of an aromatic or aliphatic carboxylic acid containing from 4 to 14 carbon atoms, the improvement which comprises incorporating into said aqueous alkaline eluant of from about 0.001 to about 0.2 moles per liter of an alkali metal cyanide salt.

2. A process as defined in claim 1 in which said improvement further comprises conducting said elution at a temperature of from about 45° C. to about 100° C.

3. A process as defined in claim 1 wherein said organic base functionality is attached covalently to said solid adsorbent.

4. A process as defined in claim 1 wherein said organic base functionality is a guanidine functionality of a guanidine compound.

5. A process as defined in claim 4 wherein the extraction reagent having guanidyl functionality has the formula

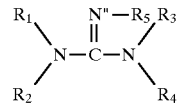

wherein $R_1$ through $R_5$ is selected from the group consisting of H, an ion exchange resin carrier and hydrocarbon groups having up to 25 carbon atoms and provided further that when one of the R groups $R_1$ through $R_5$ is an ion exchange resin carrier, the remaining R groups are H or an aliphatic or aromatic hydrocarbon group having up to 25 carbon atoms.

6. A process as defined in claim 5 wherein when one of the R groups $R_1$ through $R_5$ is an ion exchange resin carrier to which the guanidine functionality is chemically bonded to the carrier, the remaining R groups are all hydrogen providing an unsubstituted guanidyl functionality.

7. In a process of eluting gold adsorbed on a solid adsorbent carrying an organic base functionality of a compound having a $pK_a$ between about 9 and about 14 in which the gold is eluted from the solid adsorbent with an aqueous alkaline solution having a pH above about 12 and containing an alkali metal salt of an aromatic or aliphatic carboxylic acid containing from 4 to about 14 carbon atoms, the improvement comprising adding to said aqueous alkaline eluant solution from about 0.001 to about 0.2 moles per liter of an alkali metal cyanide salt.

8. A process of recovering gold from a cyanide leach solution containing gold, comprising (a) contacting said cyanide leach solution containing the gold with a solid adsorbent carrying an organic base functionality of a compound having a $pK_a$ between about 9 and about 14 to adsorb said gold in the form of an aurocyanide complex onto said solid adsorbent; and (b) contacting the solid adsorbent containing the aurocyanide complex with a concentrated aqueous solution of a zinc tetracyanide salt whereby the aurocyanide complex is displaced with a zinc tetracyanide complex; and (c) contacting the solid adsorbent, now containing the zinc tetracyanide complex with an aqueous caustic solution; and (d) recovering the gold.

* * * * *